United States Patent [19]

Naber

[11] Patent Number: 5,318,825

[45] Date of Patent: Jun. 7, 1994

[54] PAPER-PRODUCT SHEET HAVING CONCEALED REPOSITIONABLE ADHESIVE

[76] Inventor: Thomas C. Naber, 7134 E. Briarwood Dr., Englewood, Colo. 80112

[21] Appl. No.: 57,344

[22] Filed: May 3, 1993

[51] Int. Cl.⁵ .......................... B32B 7/14; B41L 1/24
[52] U.S. Cl. .......................... 428/192; 428/40; 428/42; 428/194; 428/198; 428/343; 428/355; 283/74; 283/75; 40/594; 40/638
[58] Field of Search .................. 428/40, 194, 42, 343, 428/192, 198, 355; 283/75, 74; 40/594, 638

[56] References Cited

U.S. PATENT DOCUMENTS

| | | | |
|---|---|---|---|
| 4,127,690 | 11/1978 | Schleifenbaum et al. | 428/194 X |
| 4,590,109 | 5/1986 | Holmberg | 428/194 X |
| 4,798,401 | 1/1989 | Greig | 428/40 X |
| 4,884,826 | 12/1989 | Slagsvol | 428/40 X |
| 4,889,234 | 12/1989 | Sorensen et al. | 428/40 X |
| 4,961,811 | 10/1990 | Haugwitz | 428/40 X |
| 4,980,212 | 12/1990 | Marquis et al. | 428/194 X |
| 4,995,641 | 2/1991 | Landry et al. | 428/40 X |
| 5,089,337 | 2/1992 | Hochfeld | 428/352 |
| 5,153,041 | 10/1992 | Clements et al. | 428/40 |
| 5,217,307 | 6/1993 | McClintock | 428/40 X |

Primary Examiner—Daniel Zirker

[57] ABSTRACT

A selectively adherable paper-product sheet having on its back surface a concealed repositionable adhesive which is selectively revealable. The selectively adherable paper-product sheet comprises a single paper-product sheet having a front surface, a back surface, a main portion and a foldable border portion. The foldable border portion is folded to the back surface of the main portion and in contact therewith so that the back surface of the border portion and a portion of the back surface of the main portion have respective interfacing surfaces. A repositionable adhesive is disposed between at least a portion of these interfacing surfaces such that the folded border portion is releasably retained in a folded configuration. As a result, a paper-product sheet having a selectively-concealable repositionable adhesive on its back surface provides a convenient sheet of desired weight with selectable adhesive or non-adhesive characteristics as desired by a user. A preferred paper-product sheet is a conventional business card.

8 Claims, 1 Drawing Sheet

PAPER-PRODUCT SHEET HAVING CONCEALED REPOSITIONABLE ADHESIVE

BACKGROUND OF THE INVENTION

This invention relates generally to a paper-product sheet having a repositionable adhesive, and in particular to a paper-product sheet having a selectively-revealable concealed repositionable adhesive on its back surface which permits both selective retentive placement of the paper-product sheet on a surface as well as selective non-retentive placement on a surface.

The popularity and convenience of note paper having a repositionable adhesive on a portion of its back surface, such as that note paper manufactured by 3M Company, St. Paul, Minn., under the trademark of "Post-It Notes," is well recognized. This note paper is usually provided in a pad from which individual sheets can be removed. Along one border of the back surface of each sheet is disposed a strip of repositionable adhesive which permits a user to removably secure the sheet on a surface such as on another piece of paper. Later, as desired, the sheet can be removed and placed elsewhere or discarded.

While the above-described sheets provide a great deal of convenience in many circumstances, they suffer from a significant inconvenience in that they always adhere to other surfaces, whether or not the user desires such adherence. This results in a non-utility for such a sheet if the user wishes to place the sheet in a pocket, stack it with other papers, or the like. As a result, a need is apparent for a paper-product sheet having a selectively-concealable repositionable adhesive on its back surface to thereby provide that paper-product sheet with adhesive or non-adhesive characteristics as desired by a user.

It is therefore a primary object of the present invention to provide a paper-product sheet having a selectively-revealable concealed repositionable adhesive on its back surface.

Another object of the present invention is to provide a paper-product sheet having a foldable border portion and a main portion, with the border portion folded to the back surface of the main portion to interface with a portion of the back surface of the main portion, and including a repositionable adhesive disposed along at least a portion of the resulting interfacing surfaces.

Yet another object of the present invention is to provide a plurality of paper-product sheets each having a selectively-revealable concealed repositionable adhesive on its back surface and stacked and releasably bound to each other.

These and other objects of the present invention will become apparent throughout the description of the invention which follows.

SUMMARY OF THE INVENTION

The present invention is a selectively adherable paper-product sheet having a concealed repositionable adhesive which is selectively revealable. The selectively adherable paper-product sheet comprises a single paper-product sheet having a front surface, a back surface, a foldable border portion and a main portion. The foldable border portion is folded to the back surface of the main portion and in contact therewith so that the back surface of the border portion and a portion of the back surface of the main portion have respective interfacing surfaces. A repositionable adhesive is disposed between at least a portion of the interfacing surfaces such that the foldable border portion, when folded, is releasably retained in a folded configuration. Preferably, a score line is provided at the site of folding of the border portion. The selectively adherable paper-product sheets according to the invention can be of any weight of paper as usually used for written correspondence, and additionally includes a card weight such as that usually found in everyday business cards. One preferred embodiment is a business card having a border portion and a repositionable adhesive as described above. A second preferred embodiment is a stack of individual selectively adherable paper-product sheets, as described above, releasably bound to each other in a pad formation. As a result, a paper-product sheet having a selectively-concealable repositionable adhesive on its back surface provides a convenient sheet of desired weight with adhesive or non-adhesive characteristics as desired by a user.

BRIEF DESCRIPTION OF THE DRAWINGS

An illustrative and presently preferred embodiment of the invention is shown in the accompanying drawings in which.

DETAILED DESCRIPTION OF A PREFERRED EMBODIMENT

Figure 1:
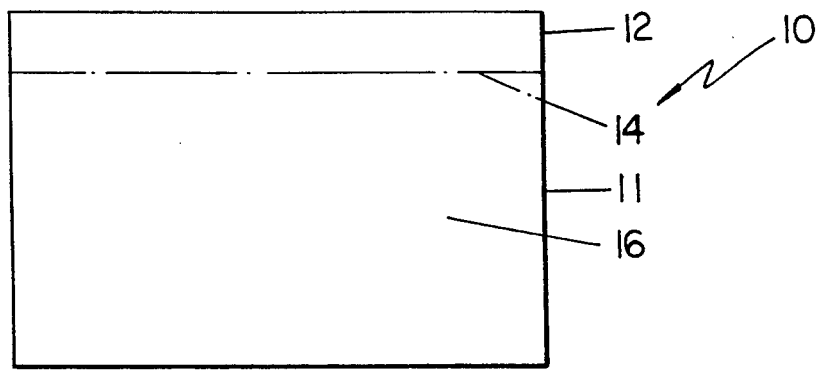
FIG. 1 is a front surface elevation view of a card having a foldable border portion along its top.
Figure 2:
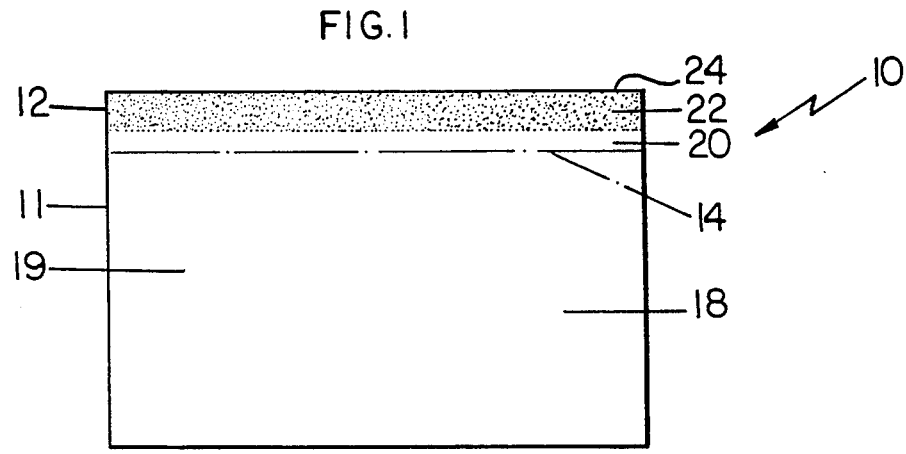
FIG. 2 is a back surface elevation view of the card of FIG. 1.

Referring to FIGS. 1 and 2, a selectively adherable business card 10 having a main portion 11 and a foldable border portion 12 along its top is shown. A score line 14 is provided at the site of folding to thereby provide for a uniform and easily-accessible fold reference. The card 10 has front surface 16 and a back surface 18, with the back surface of the main portion 11 here designated as 19 and the back surface of the border portion 12 here designated as 20. The back surface 20 of the foldable border portion 12 has disposed thereon a repositionable adhesive 22 along substantially the entire width of the back surface 20 and extending inwardly from the edge 24 of the foldable border portion 12. While the repositionable adhesive 22 here shown extends inwardly about two-thirds of the height of the foldable border portion 12, the adhesive 22 can be applied to extend to the score line 14 and/or can begin its inward extent toward the score line 14 at a site inward from the edge 24. Conversely, instead of applying the repositionable adhesive 22 to the back surface 20 of the foldable border portion 12, it can be applied to that portion of the back surface 19 of the main portion 11 which will be positioned beneath the foldable border portion 12 when the border portion 12 is folded against the back surface 18 of the main portion 11.

Figure 3:
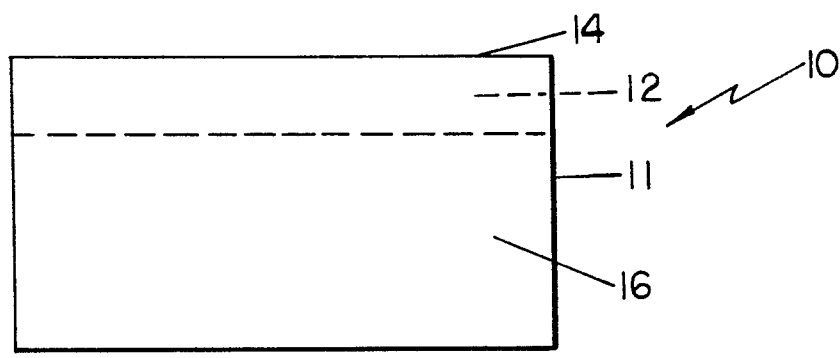
FIG. 3 is a front surface elevation view of the card of FIG. 1 with the foldable border portion folded to the back surface.

FIG. 3 illustrates the card 10 with the foldable border portion 12 folded against the back surface 19 of the main portion 11 and there releasably retained by the repositionable adhesive 22 along a portion of respective interfacing surfaces. The card 10 as shown in FIG. 3 represents the configuration in which a user would receive this product. Thus, the card 10 of FIG. 3 appears as a usual business card which would be given to clients, customers or the like. However, if the giver or receiver of the card 10 wishes to conveniently and retainably secure it with other material such as sales literature or the like, he or she can simply disengage the folded border portion 12 from the back surface 19 of the main portion 11 to reveal the repositionable adhesive 22 and thereafter attach the card 10 to the other material with the now-exposed adhesive 22. Subsequently, if the receiver of the card 10 wishes to place it at a site where adhesiveness is not desired, as in a pocket, wallet or card file, he or she simply re-folds the foldable border portion 12 against the back surface 19 of the main portion 11 where the border portion 12 is again retained to thereby once again have a freely-movable business card reference which continues to offer adhesiveness with a simple repeated disengagement of the border portion 12 as described above.

In the preferred embodiment, the dimensions of the card 10 when the border portion 12 is folded is about 2 inches (5.1 cm) long and about 3.5 inches (8.9 cm.) wide. Dimensions of the border portion 12 are about 0.5 inch (1.25 cm.) long and, being the same width as the card, about 3.5 inches (8.9 cm.)wide. Of course, a card of different dimensions can be employed. Likewise, while the border portion 12 here illustrated is about 25% of the length of the main portion 11, other proportions can be provided, so long as a sufficient quantity of adhesive is presented when exposed to thereby accomplish adherence of the card to another surface when the back surface of the border portion is in a non-folded configuration. Further, while the repositionable adhesive 22 extends the width of the border portion 12 in the preferred embodiment, it can be present in less than the full width, again so long as the adhesive qualities needed are present over a sufficient dimension. Also, the foldable border portion can be of a width less than the width of the main portion.

Figure 4:
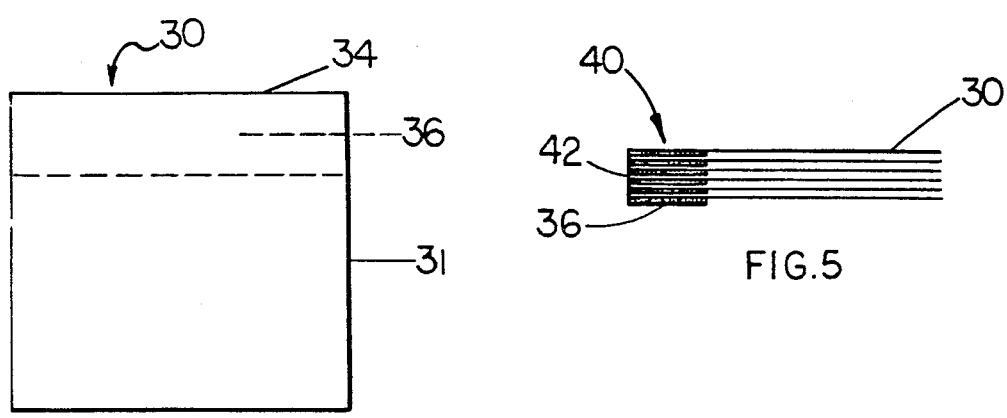
FIG. 4 is a front surface elevation view of a sheet of paper having a foldable border portion along its top, with the border portion folded to the back surface.
Figure 5:
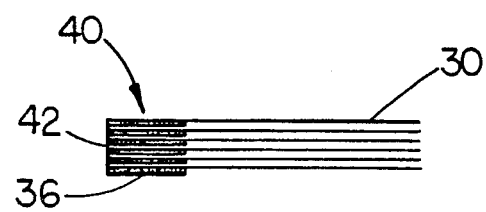
FIG. 5 is a side elevation graphic view of a stack of individual sheets of paper of FIG. 4 releasably bound to each other in a pad.

FIGS. 4 and 5 show a second embodiment of the present invention comprising a plurality of selectively adherable sheets 30 of paper, here being a typical 20-pound weight, releasably bound to each other. As shown in FIG. 4, each sheet 30 has a main portion 31 and a foldable border portion 36 having a score line 34 at the site of the fold. Each sheet 30 has a front surface and a back surface. The border portion 36 is folded to the back surface of the main portion 31 and in contact therewith. Resultantly, the back surface of the border portion 36 and a portion of the back surface of the main portion 31 have respective interfacing surfaces. A repositionable adhesive is disposed between these interfacing surfaces in the same configuration as described in relation to the card 10 of FIGS. 1-3 such that the folded border portion 36 of each sheet 30 is releasably retained in a folded configuration along at least a portion of the interfacing surfaces. FIG. 5 graphically illustrates the plurality of sheets 30, with respective border portions 36 in a folded configuration, stacked on each other and releasably bound to each other as a pad 40. The sheets 30 are releasably bound to each other along adjacent respective edges with adhesive 42 for padding paper as known in the art. Dimensions of the sheets 30 can be as desired, including, for example, 2 inches by 2 inches (5.1 cm. by 5.1 cm.) when the border portion 36 is folded, as well as smaller or larger sizes of squares, rectangles, and the like. These sheets 30 have the same attributes as described above in relation to the cards 10 and therefore can exhibit or conceal adhesiveness as desired by the user.

Production of the business cards 10 commences as known in the art with printing on card stock as desired. Ultimate individual cards 10 must, of course, be sized to include therewith the border portions 12. Thereafter, or simultaneously, depending upon the manufacturing machinery employed and as recognized in the art, the score line 14 is provided, the repositionable adhesive 22 is applied, and the border portion 12 is folded to the back surface 18 where it is there releasably retained. Cutting of the card stock proceeds as dictated by the machinery employed to thereby produce individual cards 10. One repositionable adhesive which can be employed is that as available from the 3M Company, St. Paul, Minn., in a spray form under the name "Re-Mount." If a spray-dispenser package is used, application of the adhesive is best performed by hand, with the spray directed at the back surface 20 of the foldable border 12 while the back surface 19 of the main portion 11 is protected from any overspray. Conversely, a repositionable adhesive such as a commercially-available hot-melt or otherwise liquid repositionable adhesive can be employed in automated application equipment as known in the art. Obviously, of course, individual cards 10 can be constructed by hand if such construction is indicated or desired. Production of the sheets 30 can be accomplished in like manner to those processes described above for the cards 10, as would be recognized by the skilled artisan.

While an illustrative and presently preferred embodiment of the invention has been described in detail herein, it is to be understood that the inventive concepts may be otherwise variously embodied and employed and that the appended claims are intended to include such variations except insofar as limited by the prior art.

What is claimed is:

1. An adherable paper-product sheet comprising:
   (a) a paper-product sheet having a front surface and a back surface, the sheet further consisting of a foldable border portion and a main portion, with the back surface of the border portion folded to the back surface of the main portion and in contact therewith so that the back surface of the border portion and a portion of the back surface of the main portion have respective interfacing surfaces; and
   (b) on the back surface a selectively revealable, concealed repositionable adhesive disposed entirely between at least a portion of the interfacing surfaces such that the folded border portion is releasably retained in a folded configuration.

2. An adherable paper-product sheet as claimed in claim 1 wherein the paper-product sheet is a card.

3. An adherable paper-product sheet as claimed in claim 1 wherein the foldable border portion is provided with a score line along which the border portion is folded.

4. An adherable paper-product sheet as claimed in claim 3 wherein the paper-product sheet is a card.

5. An adherable paper-product sheet as claimed in claim 1 wherein the length dimension of the border portion is about 25% of the length dimension of the main portion.

6. An adherable paper-product sheet as claimed in claim 5 wherein the paper-product sheet is a card.

7. A plurality of adherable paper-product sheets, each adherable paper-product sheet comprising a sheet having a front surface and a back surface, the sheet further consisting of a foldable border portion and a main portion, with the back surface of the border portion folded to the back surface of the main portion and in contact therewith so that the back surface of the border portion and a portion of the back surface of the main portion have respective interfacing surfaces, and having on the back surface a selectively revealable, concealed repositionable adhesive disposed entirely between at least a portion of the interfacing surfaces such that the folded border portion is releasably retained in a folded configuration, wherein the plurality of adherable paper-product sheets are stacked on each other in the form of a pad and releasably bound to each other along adjacent respective edges.

8. A plurality of adherable paper-product sheets as claimed in claim 7 wherein the foldable border portion of each paper-product sheet is provided with a score line along which the border portion is folded.

* * * * *